United States Patent
Demeaux et al.

(10) Patent No.: US 12,381,259 B2
(45) Date of Patent: *Aug. 5, 2025

(54) FLUORINATED ELECTROLYTE COMPOSITION FOR A LITHIUM-ION ELECTROCHEMICAL CELL

(71) Applicant: SAFT, Levallois-Perret (FR)

(72) Inventors: Julien Demeaux, Bruges (FR); Marlène Oswald, Blanquefort (FR)

(73) Assignee: SAFT, Levallois-perret (FR)

( * ) Notice: Subject to any disclaimer, the term of this patent is extended or adjusted under 35 U.S.C. 154(b) by 644 days.

This patent is subject to a terminal disclaimer.

(21) Appl. No.: 17/638,442

(22) PCT Filed: Aug. 21, 2020

(86) PCT No.: PCT/EP2020/073497
§ 371 (c)(1),
(2) Date: Feb. 25, 2022

(87) PCT Pub. No.: WO2021/037721
PCT Pub. Date: Mar. 4, 2021

(65) Prior Publication Data
US 2023/0006257 A1 Jan. 5, 2023

(30) Foreign Application Priority Data
Aug. 29, 2019 (FR) ...................................... 1909501

(51) Int. Cl.
*H01M 10/0569* (2010.01)
*H01M 4/587* (2010.01)
(Continued)

(52) U.S. Cl.
CPC ....... *H01M 10/0569* (2013.01); *H01M 4/587* (2013.01); *H01M 10/0525* (2013.01);
(Continued)

(58) Field of Classification Search
CPC ......... H01M 10/0525; H01M 10/0567; H01M 10/0568; H01M 10/0569;
(Continued)

(56) References Cited

U.S. PATENT DOCUMENTS

2015/0050561 A1 2/2015 Zhang et al.
2018/0069267 A1 3/2018 Suzuki et al.

FOREIGN PATENT DOCUMENTS

CN 109449487 A 3/2019
CN 109449511 A 3/2019
(Continued)

OTHER PUBLICATIONS

Machine translation cn109445911A (Year: 2019).*
(Continued)

*Primary Examiner* — Victoria H Lynch
(74) *Attorney, Agent, or Firm* — Sughrue Mion, PLLC

(57) ABSTRACT

Disclosed is an electrolyte composition comprising: a) a solvent comprising: i) either a mixture of 1,1,1,3,3,3-hexaflu-oro-2-methoxypropane (HFMP) or of 1,1,1,3,3,3-hexafluoro-2-(fluoromethoxy)propane (HFMFP), of monofluoroethylene carbonate (F1EC) and of 2,2,2-trifluoroethyl methyl carbonate (F3EMC), ii) or a mixture of 1,1,1,3,3,3-hexafluoro-2-methoxypropane (HFMP) or of 1,1,1,3,3,3-hexafluoro-2-(fluoromethoxy)propane (HFMFP), of monofluoroethylene carbonate (F1EC) and of 2,2,2-trifluoroethyl acetate (F3EA), b) at least one lithium salt, the cation of which is the cation of an alkali metal.

12 Claims, 4 Drawing Sheets

(51) Int. Cl.
    *H01M 10/0525*    (2010.01)
    *H01M 10/0567*    (2010.01)
    *H01M 4/02*    (2006.01)

(52) U.S. Cl.
    CPC .. *H01M 10/0567* (2013.01); *H01M 2004/027* (2013.01); *H01M 2300/0042* (2013.01)

(58) Field of Classification Search
    CPC ... H01M 2004/027; H01M 2300/0034; H01M 2300/004; H01M 2300/0042; H01M 4/587; Y02E 60/10
    See application file for complete search history.

(56)           References Cited

FOREIGN PATENT DOCUMENTS

| | | | |
|---|---|---|---|
| CN | 109713367 A | | 5/2019 |
| JP | 2019087530 A | * | 6/2019 |
| JP | 2019-133773 A | | 8/2019 |

OTHER PUBLICATIONS

Machine translation jp2019087530A (Year: 2019).*
International Search Report of PCT/EP2020/073497 dated Nov. 16, 2020 [PCT/ISA/210].

* cited by examiner

[Fig. 1]
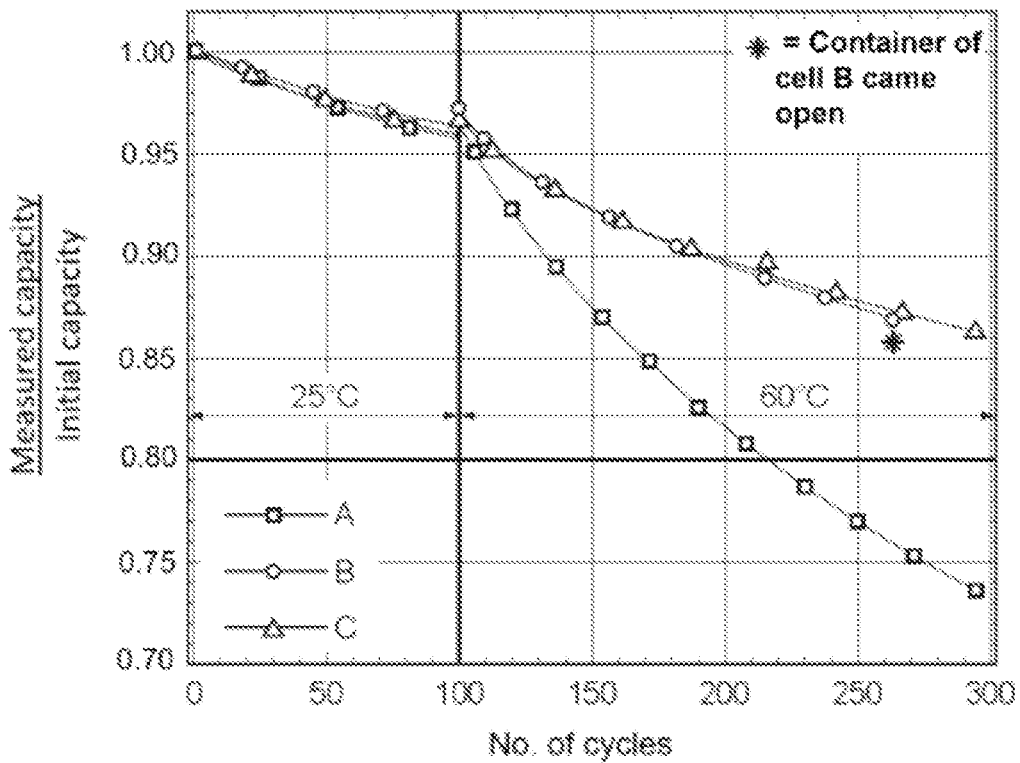
[Fig. 2]
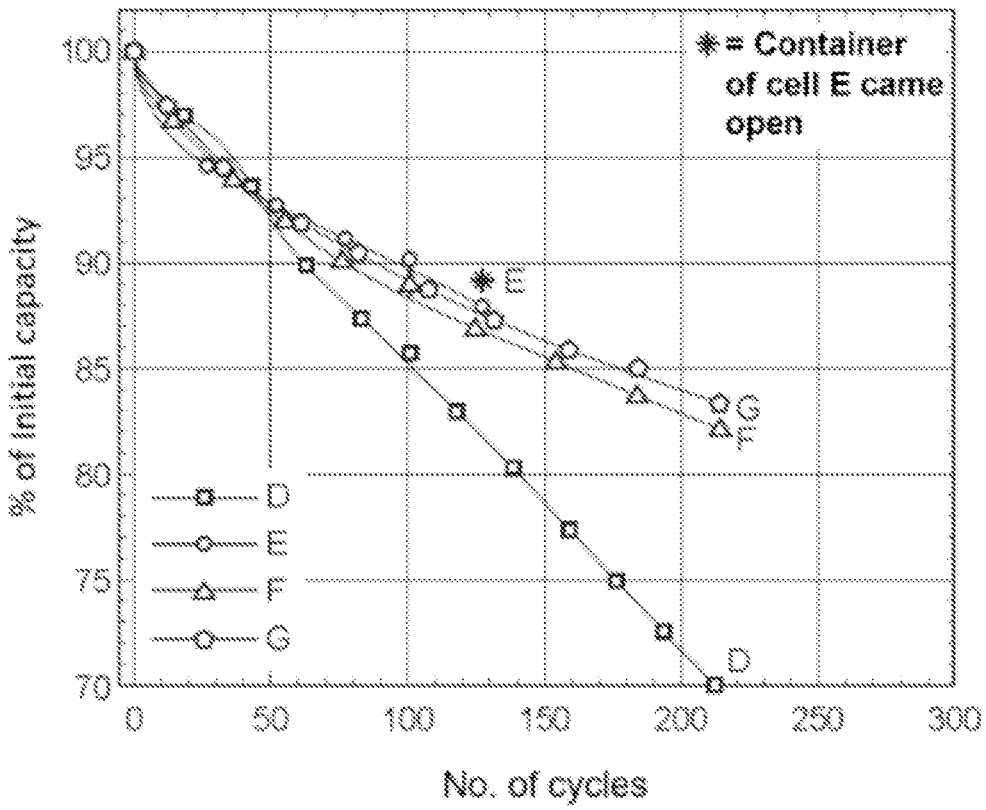

[Fig. 3]
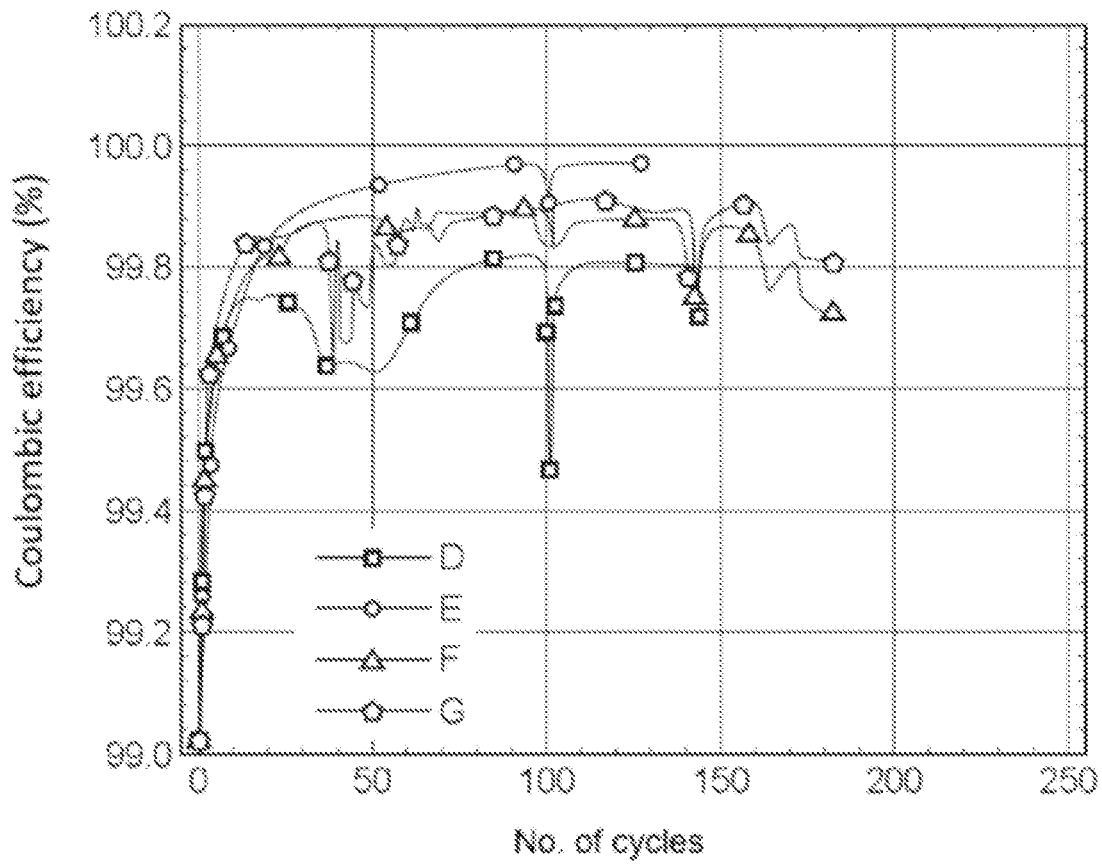
[Fig. 4]
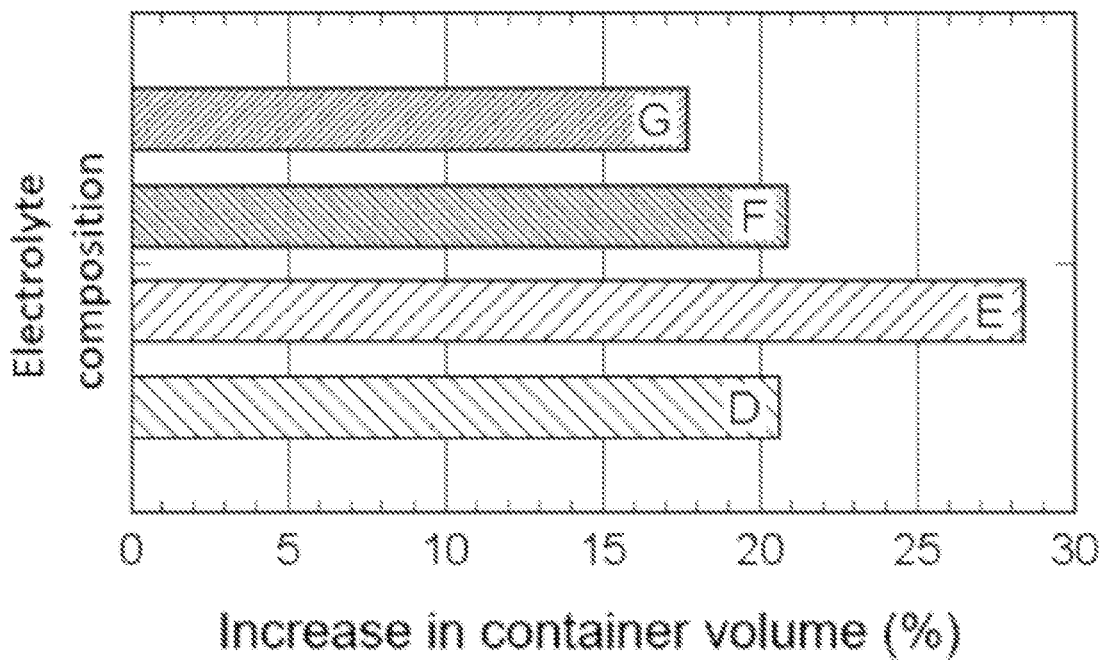

[Fig. 5]
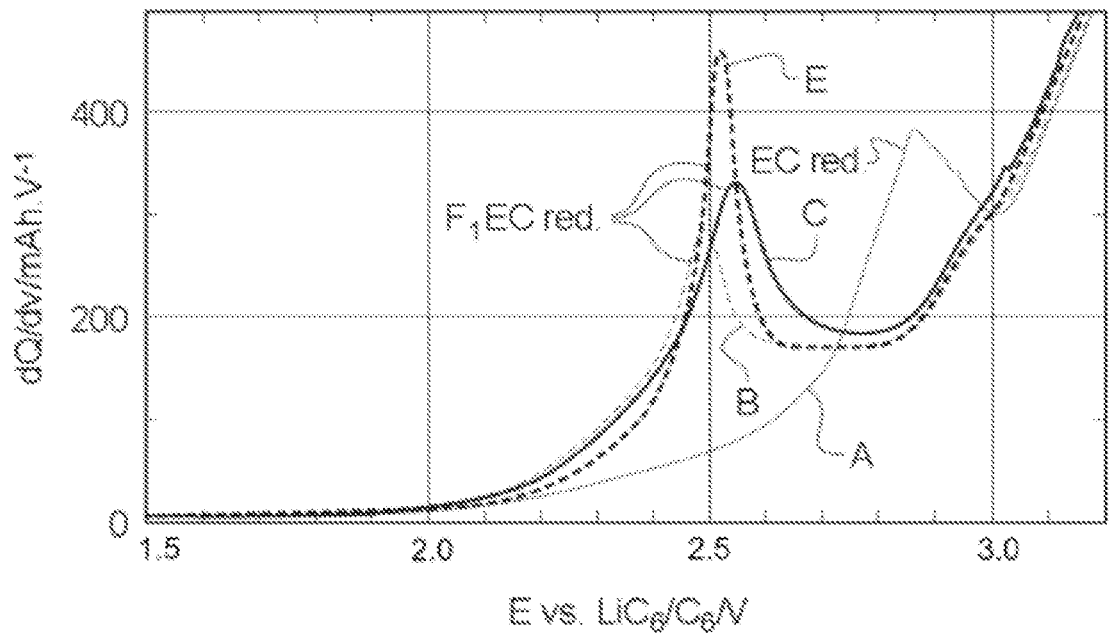
[Fig. 6]
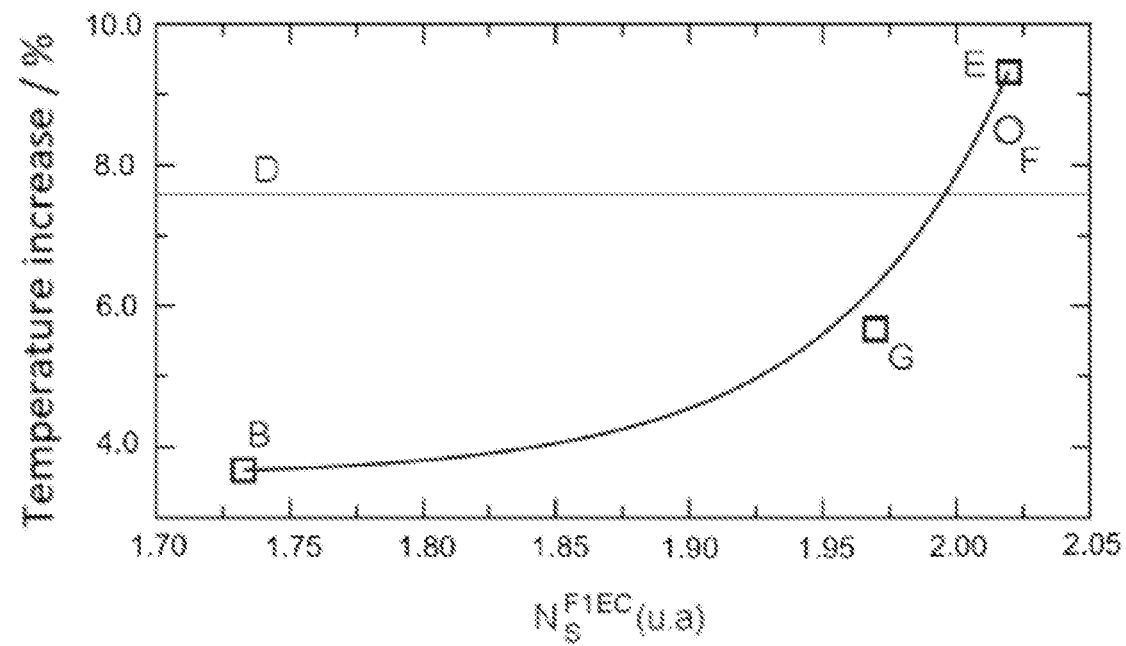

[Fig. 7]
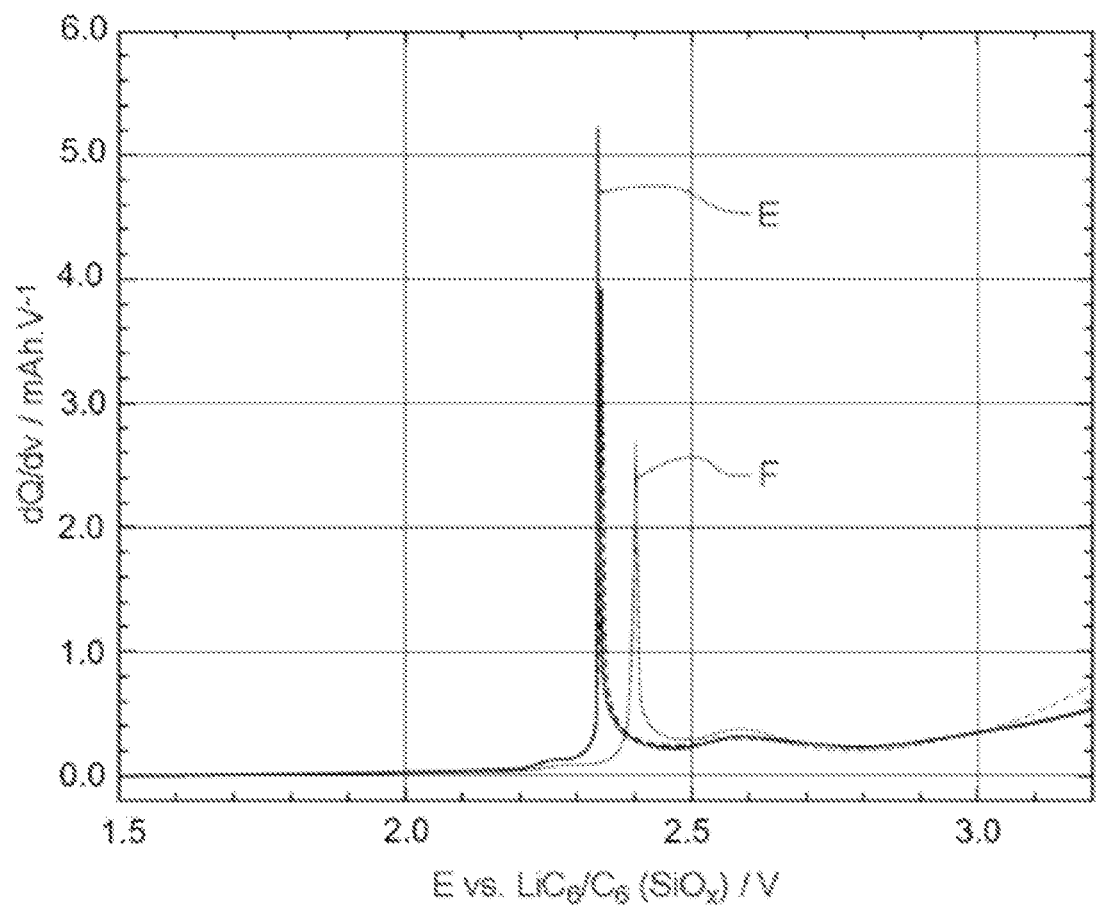

FLUORINATED ELECTROLYTE COMPOSITION FOR A LITHIUM-ION ELECTROCHEMICAL CELL

CROSS REFERENCE TO RELATED APPLICATIONS

This application is a National Stage of International Application No. PCT/EP2020/073497, filed Aug. 21, 2020, claiming priority to French Patent Application No. 19 09 501, filed Aug. 29, 2019.

FIELD OF THE INVENTION

The invention is in the field of electrolyte compositions for rechargeable lithium-ion electrochemical cells.

BACKGROUND ART

Rechargeable lithium-ion type electrochemical cells are known in the prior art. As a result of their high bulk energy density and energy density for a given volume, they are a promising electric power source. They comprise at least one cathode (positive electrode), the active material of which is generally a lithiated oxide of at least one transition metal or a lithiated phosphate of at least one transition metal, and at least one anode (negative electrode), the active material of which may be graphite-based. Such cells nevertheless have a limited lifetime when used in cycling at a temperature above room temperature, typically between 25° C. and 85° C. The loss of capacity of such cells can reach 20% of their initial capacity after about 100 cycles of charge/discharge carried out at 85° C. At such a temperature, the constituents of the cell rapidly degrade leading to either short-circuiting of the cell or an increase in its internal resistance. In addition, the electrolyte heats up, tends to decompose into gas, resulting in an increase in the pressure inside the container of the cell. If this increase in pressure is not controlled, it may lead to a rupture of the container of the cell, thereby exposing the electrode plate group to ambient air and an irreversible failure of the cell.

It is therefore sought to provide novel lithium-ion electrochemical cells having improved lifetime when used in cycling at a temperature above room temperature, i.e. ranging from about 20-25° C. to 85° C. It is considered that this objective is achieved when cells are capable of operating under cycling conditions by performing at least 200 cycles with a discharge depth of 100% without a loss of capacity of more than 20% of their initial capacity being observed.

In addition to improving the service life of the lithium-ion electrochemical cells, it is desirable that such cells can operate under cycling conditions in such a temperature range without the risk of their container breaking open.

Various documents disclose electrochemical cells of the lithium-ion type that overcome these drawbacks:

European patent application, publication No. 3,195,388 discloses an electrolyte composition for a lithium-ion electrochemical cell. It is stated that this composition makes it possible to reduce the generation of gas, for example when the cell is stored at a temperature of 90° C. The electrolyte composition comprises:
a) a fluorinated solvent,
b) an organic carbonate,
c) a saturated or unsaturated sultone, optionally substituted by one or more halogen(s) or by one or more aryl groups or one or more saturated or unsaturated cyclic, branched or linear alkyl groups, and
d) at least one electrolyte salt.

International application WO 2013/180783 discloses an electrolyte composition for a lithium-ion electrochemical cell. It is stated that this composition makes it possible to improve the cycling performance of the cell at high temperatures, particularly when it operates at a high voltage of up to 5 V. This composition comprises:
a) at least one salt
b) at least one fluorinated carboxylic acid ester having the formula $R^1$—C(O)O—$R^2$, wherein
$R^1$ is $CH_3CH_2$— and $R^2$ is —$CH_2CHF_2$,
$R^1$ is $CH_3$— and $R^2$ is —$CH_2CH_2CHF_2$,
$R^1$ is $CH_3CH_2$— and $R^2$ is —$CH_2CH_2CHF_2$,
$R^1$ is $CHF_2CH_2CH_2$— and $R^2$ is —$CH_2CH_3$, or
$R^1$ is $CHF_2CH_2$— and $R^2$ is —$CH_2CH_3$.

European patent application, publication No. 2,637,245 discloses an electrolyte composition for a lithium-ion electrochemical cell. This composition is presented as having low reactivity as regards their charged cathode and anode and low flammability. Its high boiling point has the advantage of reducing the risk of an increase in pressure in the container of the cell. The composition comprises a solvent comprising a compound of formula R—O—C(=O)—O—R', wherein
R is $C_pH_{2p+1}$ and p is an integer ranging from 1 to 4, and
R' is —C($R_h^7$)($R_h^8$)CF$R_f^1$(CF$_2$CF$_2$)$_n$CHF$R_f^7$, wherein
$R_f^1$ is fluorine or $C_pF_{2p+1}$,
$R_f^7$ is F, $C_pF_{2p+1}$, or $R_f^3$O($R_f^4$O)$_m$—, and $R_h^7$ and $R_h^8$ are independently H or an alkyl group and wherein both $R_h^7$ and $R_h^8$ are not alkyl groups, the alkyl groups having 1 to 4 carbon atoms, m is 0 or 1, and n is 0 or 1.

International application WO 2012/132976 discloses a lithium-ion cell having excellent cycling performance, even at a high temperature, and low swelling of its container. The cell comprises a liquid electrolyte comprising:
a linear fluorinated ester represented by the formula $R_1$—C(=O)O—$R_2$ wherein $R_1$ and $R_2$ represent an alkyl group or a fluorine-substituted alkyl group, at least one of the groups $R_1$ and $R_2$ being a fluorine-substituted alkyl group;
a linear fluorinated ether represented by the formula $R_a$—O—$R_b$ wherein $R_a$ and $R_b$ represent an alkyl group or a fluorine-substituted alkyl group, wherein at least one of the groups $R_a$ and $R_b$ is a fluorine-substituted alkyl group.

European patent 0,806,804 discloses a lithium-ion cell having good cycling performance and the solvent of which has good chemical stability. The solvent comprises ethylene trifluorocarbonate (4-trifluoromethyl-1,3-dioxolane-2-one) and at least one compound selected from fluoromethyl trifluoroethyl carbonate of formula $CH_2F$—O—C(=O)—O—$CH_2$—$CF_3$ and di-1-trifluoroethyl carbonate of formula $CF_3$—$CH_2$—O—C(=O)—O—$CH_2$—$CF_3$.

U.S. Pat. No. 9,406,976 discloses a lithium-ion cell having good cycling performance and providing increased safety in use. The solvent of the electrolyte of this cell is a fluorinated ether of formula R—O—R' wherein R and R' are independently a C1-C6 alkyl group or a C1-C6 fluoroalkyl group, at least R or R' being a C1-C6 fluoroalkyl group, the degree of fluorine substitution in the fluorinated ether of formula R—O—R' being greater than 0% and less than or equal to 50%.

US Patent application 2005/0031963 discloses a lithium-ion cell providing increased safety in use without sacrificing electrical performance. The electrolyte of this cell comprises a solvent comprising fluoroethylene carbonate and a non-fluorinated linear ester. The fluoroethylene carbonate may be selected from ethylene monofluorocarbonate and ethylene difluorocarbonate.

US Patent application 2015/0050561 discloses a lithium-ion cell capable of operating at a high voltage of 5V and comprising an electrolyte that is stable during cycling operation of the cell at room temperature or above ambient temperature, even at this high voltage. The electrolyte may comprise a mixture of ethylene monofluorocarbonate, trifluoroethyl methyl carbonate and 1,1,2,2-tetrafluoroethyl-2,2,3,3-tetrafluoropropyl ether.

There is a need for new electrolyte compositions able to overcome the disadvantages of the above lithium-ion cells.

SUMMARY OF THE INVENTION

To this end, the invention provides an electrolyte composition comprising:
  a) a solvent comprising:
    i) either a mixture of 1,1,1,3,3,3-hexafluoro-2-methoxypropane (HFMP) and/or of 1,1,1,3,3,3-hexafluoro-2-(fluoromethoxy)propane (HFMFP), ethylene monofluorocarbonate (F1EC) and 2,2,2-trifluoroethyl methyl carbonate (F3EMC),
    ii) or a mixture of 1,1,1,3,3,3-hexafluoro-2-methoxypropane (HFMP) and/or of 1,1,1,3,3,3-hexafluoro-2-(fluoromethoxy) propane (HFMFP), ethylene monofluorocarbonate (F1EC) and 2,2,2-trifluoroethyl acetate (F3EA),
  b) at least one salt the cation of which is the cation of an alkali metal.

It has been surprisingly found that the use of 1,1,1,3,3,3-hexafluoro-2-methoxypropane (HFMP) and/or of 1,1,1,3,3,3-hexafluoro-2-(fluoromethoxy) propane (HFMFP), in association with either a mixture of ethylene monofluorocarbonate (F1EC) and 2,2,2-trifluoroethyl methyl carbonate (F3EMC), or a mixture of ethylene monofluorocarbonate (F1EC) and 2,2,2-trifluoroethyl acetate (F3EA) makes it possible to increase the service life of a lithium-ion cell when it is used under cycling conditions at a temperature above room temperature, for example ranging from 20 to 25° C. up to 85° C.

It has been found that the use of 2,2,2-trifluoroethyl acetate (F3EA) in the mixture ii) makes it possible, in addition to increasing the service life of the cell, to reduce the risk of the container of the cell breaking open when the latter is used at a temperature higher than room temperature.

It has also been found that the addition of lithium difluorophosphate $LiPO_2F_2$ to either of the mixtures i) and ii) makes it possible to reduce the risk of the container of the cell breaking open when the latter is used at a temperature higher than room temperature.

Finally, it has been observed that the electrolyte composition according to the invention has interesting properties of flame retardancy.

In one embodiment, the electrolyte composition comprises in addition to said at least one salt, lithium difluorophosphate $LiPO_2F_2$.

According to an embodiment, the percentage by weight of lithium difluorophosphate makes up from 0.05 to 5%, preferably from 0.05 to 2%, more preferably 0.1 to 1% of the weight of the combined weight of the solvent and the said at least one salt.

According to one embodiment, the at least one salt is a lithium salt and its concentration is greater than or equal to 0.7 mol·L$^{-1}$ and less than or equal to 4 mol·L$^{-1}$.

According to one embodiment, the lithium salt is lithium hexafluorophosphate ($LiPF_6$).

According to one embodiment, the electrolyte composition comprises lithium hexafluorophosphate ($LiPF_6$) and lithium difluorophosphate ($LiPO_2F_2$).

According to a further embodiment, the electrolyte composition comprises lithium fluorosulfonyl imide (LiFSI).

According to one embodiment, the 1,1,1,3,3,3-hexafluoro-2-methoxypropane (HFMP) and/or the 1,1,1,3,3,3-hexafluoro-2-(fluoromethoxy) propane (HFMFP) makes up 10-50% of the volume of the solvent or 15-40% of the volume of the solvent or 20-30% of the volume of the solvent.

According to another embodiment, the solvent is a mixture of 1,1,1,3,3,3-hexafluoro-2-methoxypropane (HFMP) and/or of 1,1,1,3,3,3-hexafluoro-2-(fluoromethoxy) propane (HFMFP), ethylene monofluorocarbonate (F1EC) and 2,2,2-trifluoroethyl methyl carbonate (F3EMC), and the sum of the percentages by volume of the 1,1,1,3,3,3-hexafluoro-2-methoxypropane (HFMP) and/or of the 1,1,1,3,3,3-hexafluoro-2-(fluoromethoxy) propane (HFMFP) and the 2,2,2-trifluoroethyl methyl carbonate (F3EMC) expressed with respect to the volume of the solvent is greater than or equal to 50% or greater than or equal to 60%.

According to one embodiment, the 1,1,1,3,3,3-hexafluoro-2-methoxypropane (HFMP) and/or the 1,1,1,3,3,3-hexafluoro-2-(fluoromethoxy) propane (HFMFP) makes up 20 to 30% of the volume of the solvent,
  the ethylene monofluorocarbonate (F1EC) makes up 15 to 40% of the volume of the solvent,
  the 2,2,2-trifluoroethyl methyl carbonate (F3EMC) makes up 30 to 50% of the volume of the solvent.

According to one embodiment, the solvent is a mixture of 1,1,1,3,3,3-hexafluoro-2-methoxypropane (HFMP) and/or of 1,1,1,3,3,3-hexafluoro-2-(fluoromethoxy) propane (HFMFP), ethylene monofluorocarbonate (F1EC) and 2,2,2-trifluoroethyl acetate (F3EA), and the sum of the percentages by volume of 1,1,1,3,3,3-hexafluoro-2-methoxypropane (HFMP) and/or of the 1,1,1,3,3,3-hexafluoro-2-(fluoromethoxy) propane (HFMFP) and of the 2,2,2-trifluoroethyl acetate (F3EA) expressed with respect to the volume of the solvent is greater than or equal to 50% or greater than or equal to 60%.

According to one embodiment:
  the 1,1,1,3,3,3-hexafluoro-2-methoxypropane (HFMP) and/or the 1,1,1,3,3,3-hexafluoro-2-(fluoromethoxy) propane (HFMFP) makes up 20 to 30% of the volume of the solvent,
  the ethylene monofluorocarbonate (F1EC) makes up 15 to 40% of the volume of the solvent,
  the 2,2,2-trifluoroethyl acetate (F3EA) makes up 30 to 50% of the volume of the solvent.

The invention also provides an electrochemical cell comprising:
  at least one anode,
  at least one cathode,
  the electrolyte composition as described above.

The electrochemical cell may be a lithium-ion type.
In one embodiment, the anode is graphite-based.

BRIEF DESCRIPTION OF THE DRAWINGS

FIG. 1 shows variation in the ratio between the capacity of cells A, B and C and their initial capacity during cycling comprising 100 cycles performed at a temperature of 25° C. followed by about 200 cycles performed at a temperature of 60° C.

FIG. 2 shows variation in the capacity of cells D to G expressed as a percentage of their initial capacity during cycling at a temperature of 60° C.

FIG. 3 shows variation in the coulombic efficiency of cells D to G during cycling performed under the conditions of those of FIG. 2.

FIG. 4 shows increase in volume of the container of cells D to G expressed in percentage, after cycling these cells for 100 cycles at a temperature of 60° C.

FIG. 5 shows electrochemical capacity induced by electrochemical reduction of certain species of the solvent during the first charge of the cell. The tested electrolyte compositions are compositions A, B, C and E.

FIG. 6 shows temperature increase observed during formation of the passivation layer (SEI) during the first charge of cells containing the electrolyte compositions B, E, F and G. The temperature rise is shown for different values of the F1EC solvation number. By way of comparison, the increase in temperature observed for cell D not containing F1EC is indicated.

FIG. 7 shows electrochemical capacity induced by electrochemical reduction of certain species of the solvent solvating lithium ions. The electrolyte compositions E and F were tested.

DETAILED DESCRIPTION OF EMBODIMENTS

The electrolyte composition according to the invention and the various constituents of an electrochemical cell comprising the electrolyte composition according to the invention will be described below.

Electrolyte Composition:

The electrolyte composition comprises a solvent, which comprises:
- either a mixture i) of 1,1,1,3,3,3-hexafluoro-2-methoxypropane (HFMP) and/or of 1,1,1,3,3,3 -hexafluoro-2-(fluoromethoxy) propane (HFMFP), of ethylene monofluorocarbonate (F1EC) and 2,2,2-trifluoroethyl methyl carbonate (F3EMC),
- or a mixture ii) of 1,1,1,3,3,3-hexafluoro-2-(methoxypropane (HFMP) and/or of 1,1,1,3,3,3-hexafluoro-2-(fluoromethoxy) propane (HFMFP), ethylene monofluorocarbonate (F1EC) and 2,2,2-trifluoroethyl acetate (F3EA).

The chemical formulae of the different chemical compounds of the solvent are given below.

HFMP: 1,1,1,3,3,3 -hexafluoro-2-methoxypropane, also referred below as hexafluoromethoxypropane

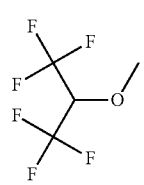
[Chem 1]

HFMFP: 1,1,1,3,3,3-hexafluoro-2-(fluoromethoxy) propane, also referred below as hexafluoro(fluoromethoxy) propane

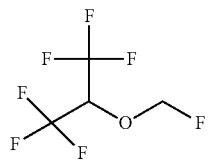
[Chem 2]

F1EC: ethylene monofluorocarbonate or 4-fluoro-1,3-dioxolan-2-one

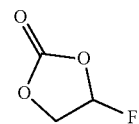
[Chem 3]

F3EMC: 2,2,2-trifluoroethyl methyl carbonate, also referred to below as trifluoroethyl methyl carbonate

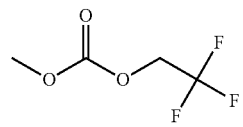
[Chem 4]

F3EA: 2,2,2-trifluoroethyl acetate, also referred to below as trifluoroethyl acetate

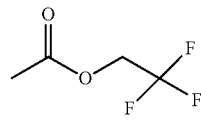
[Chem 5]

The use of hexafluoromethoxypropane (HFMP) and/or of hexafluoro(fluoromethoxy) propane (HFMFP) in association with:
- either a mixture i) of ethylene monofluorocarbonate (F1EC) and trifluoroethyl methyl carbonate (F3EMC),
- or a mixture ii) of ethylene monofluorocarbonate (F1EC) and trifluoroethyl acetate (F3EA), makes it possible to improve the service life of the cell.

Without wishing to be bound by any theory, Applicant considers that the presence of HFMP and/or HFMFP has the effect of increasing the solvation of lithium ions by F1EC and therefore leading to a passivation layer of greater thickness, which helps to improve cycling life of the cell.

The hexafluoromethoxypropane (HFMP) and/or hexafluoro(fluoromethoxy)propane (HFMFP) may make up from 10 to 50% of the volume of the solvent or from 15 to 40% of the volume of the solvent or from 20 to 30% of the volume of the solvent.

In the case of mixture i), the sum of the percentages by volume of the hexafluoromethoxypropane (HFMP) and/or the hexafluoro(fluoromethoxy)propane (HFMFP) and trifluoroethyl methyl carbonate (F3EMC) expressed with respect to the volume of the solvent may be 50% or more or greater than or equal to 60% or greater than or equal to 70%. The hexafluoromethoxypropane (HFMP) and/or hexafluoro (fluoromethoxy)propane (HFMFP) may make up 20 to 30% of the volume of the solvent. The ethylene monofluorocarbonate (F1EC) may make up 15 to 40% of the volume of the solvent. The trifluoroethyl methyl carbonate (F3EMC) may make up 30 to 50% of the volume of the solvent.

In the case of mixture ii), the sum of the percentages by volume of the hexafluoromethoxypropane (HFMP) and/or the hexafluoro(fluoromethoxy)propane (HFMFP) and trifluoroethyl acetate (F3EA) expressed with respect to the volume of the solvent may be 50% or more or greater than or equal to 60% or greater than or equal to 70%. The hexafluoromethoxypropane (HFMP) and/or hexafluoro (fluoromethoxy)propane (HFMFP) may make up 20 to 30% of the volume of the solvent. The ethylene monofluorocarbonate (F1EC) may make up 15 to 40% of the volume of the solvent. The trifluoroethyl acetate (F3EA) may make up 30 to 50% of the volume of the solvent.

In a preferred embodiment, the hexafluoromethoxypropane (HFMP) and/or the hexafluoro(fluoromethoxy)propane (HFMFP) is associated with ethylene monofluorocarbonate (F1EC) and trifluoroethyl acetate (F3EA) (mixture ii). It has indeed been found that the trifluoroethyl acetate makes it possible to avoid the decomposition of the electrolyte into a gaseous product and thus an increase in the internal pressure of the cell. Without wishing to be bound by any theory, the Applicant considers that the presence of trifluoroethyl acetate would make it possible to decrease the number of ethylene monofluorocarbonate (F1EC) molecules that solvate a lithium ion. By decreasing the number of ethylene monofluorocarbonate (F1EC) molecules around a lithium ion, the amount of carbon dioxide generated is decreased and the risk of the cell container breaking open is reduced.

The solvent may consist solely of the chemical compounds of mixture i) or consist solely of the chemical compounds of mixture ii).

The solvent may not contain:
any other cyclic carbonate than the ethylene monofluorocarbonate (F1EC), or
any other linear carbonate than the trifluoroethyl methyl carbonate (F3EMC), or
any other ester than trifluoroethyl acetate (F3EA), or
any other ester than hexafluoromethoxypropane (HFMP) and/or hexafluoro (fluoromethoxy)propane (HFMFP).

The presence of linear carbonates other than trifluoroethyl methyl carbonate F3EMC, e.g. a non-fluorinated linear carbonate, such as DMC, may cause a decrease in the solvation of lithium ions by F1EC and lead to a thinner passivation layer, detrimental to the cycling life of the cell. In addition, the presence of a non-fluorinated linear carbonate may result in a miscibility problem with the fluorinated compounds F1EC and F3EMC. Finally, the presence of a non-fluorinated linear carbonate may result in an irreversible increase in the capacity of the cell, which is not desirable.

In one embodiment, the solvent does not contain non-fluorinated chemical compounds.

The electrolyte composition comprises at least one salt the cation of which is the cation of an alkali metal. This alkali metal may be selected from lithium, sodium, potassium, and cesium. Preferably, the alkali metal is lithium. The lithium salt may be selected from lithium hexafluorophosphate LiPF$_6$, lithium tetrafluoroborate LiBF$_4$, lithium perchlorate LiClO$_4$, lithium hexafluoroarsenate LiAsF$_6$, lithium hexafluoroantimonate LiSbF$_6$, lithium trifluoromethanesulfonate LiCF$_3$SO$_3$, lithium bis(fluorosulfonyl)imide Li(FSO$_2$)$_2$N (LiFSI), lithium trifluoromethanesulfonimide LiN(CF$_3$SO$_2$)$_2$ (LiTFSI), lithium trifluoromethanesulfonemethide LiC(CF$_3$SO$_2$)$_3$ (LiTFSM), lithium bisperfluoroethylsulfonimide LiN(C$_2$F$_5$SO$_2$)$_2$ (LiBETI), lithium 4,5-dicyano-2-(trifluoromethyl) imidazolide (LiTDI), lithium bis(oxalatoborate) (LiBOB), lithium difluoro(oxalato) borate (LiDFOB), lithium tris(pentafluoroethyl)trifluorophosphate LiPF$_3$(CF$_2$CF$_3$)$_3$ (LiFAP) and mixtures thereof. Lithium hexafluorophosphate LiPF$_6$ is preferably selected.

The concentration of the at least one salt in the electrolyte varies from 0.7 to 4 mol·L$^{-1}$, or from 1 to 2 mol·L$^{-1}$, or from 1.2 to 2 mol·L$^{-1}$.

The Applicant has observed that the addition of lithium difluorophosphate to mixtures i) and ii) makes it possible, in addition to prolonging the service life of the cell, to avoid increasing the internal pressure of the cell, and thus the risk of the container coming open. The chemical formula of the lithium difluorophosphate is:

[Chem 6]

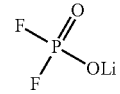

The percentage by weight of lithium difluorophosphate can be 0.05 to 5%, preferably 0.05 to 2%, more preferably 0.1 to 1% of the weight of the combination consisting of the solvent and said at least one salt.

Without wishing to be bound by any theory, the Applicant considers that the presence of lithium difluorophosphate LiPO$_2$F$_2$ would make it possible to limit the reactivity of the ethylene monofluorocarbonate (F1EC) contained in the mixtures i) and ii) with respect to the anode. By limiting the reactivity of the ethylene monofluorocarbonate (F1EC) to the anode, growth of the SEI passivation layer is limited to the surface of the anode. A passivation layer that is too thick results in a substantial rise in the temperature of the cell during its first charge (also referred to as "formation"). This phenomenon is detrimental to the service life of the cell.

Although the presence of trifluoroethyl acetate (F3EA) or lithium difluorophosphate in both cases reduces heating up of the cell, it appears that the mechanisms of action of these two chemical compounds are different. The trifluoroethyl acetate (F3EA) would act by reducing the solvation number of the ethylene monofluorocarbonate (F1EC) around a lithium ion. The lithium difluorophosphate would rather act by preventing the ethylene monofluorocarbonate, F1EC molecules forming a passivation layer (SEI) at the anode which is too thick.

The Applicant considers that by acting on the solvation number of F1EC and/or on the thickness of the passivation layer, it is possible to achieve both good service life of the cell in cycling and low emission of gas in the container of the cell.

A particularly preferred electrolyte composition comprises:
a) a solvent comprising or consisting of a mixture of hexafluoromethoxypropane (HFMP) and/or of hexafluoro(fluoromethoxy)propane (HFMFP), ethylene monofluorocarbonate (F1EC) and trifluoroethyl acetate (F3EA),
b) LiPF$_6$ in a concentration ranging from 0.7 to 2 mol·L$^{-1}$, preferably between 1 and 1.5 mol·L$^{-1}$.
c) LiPO$_2$F$_2$ in a percentage by weight ranging from 0.05 to 5%, preferably from 0.05 to 2%, more preferably from 0.1 to 1% of the weight of the combination consisting of the solvent and LiPF$_6$.

This composition combines an action on the solvation number of F1EC by the presence of F3EA and an action on the thickness of the passivation layer by the presence of $LiPO_2F_2$.

In the case where the electrolyte composition comprises lithium bis(fluorosulfonyl) imide $Li(FSO_2)_2N$ (LiFSI), it is preferable to add lithium difluorophosphate $LiPO_2F_2$ to the electrolyte composition. Indeed, LiFSI dissociates strongly in the solvent. The concentration of lithium ions in the solvent is therefore high. This results in greater decomposition of F1EC at the anode and higher gas emission. The association of $LiPO_2F_2$ with LiFSI makes it possible to avoid chemical decomposition of F1EC at the anode.

In one embodiment, the electrolyte composition contains lithium hexafluorophosphate ($LiPF_6$), lithium bis(fluorosulfonyl) imide $Li(FSO_2)_2N$ (LiFSI) and lithium difluorophosphate ($LiPO_2F_2$).

Active Material of the Anode:

The active material of the anode is preferably a carbonaceous material which may be selected from graphite, coke, carbon black and glassy carbon.

In another embodiment, the anode active material contains a silicon-based or tin-based compound.

Active Material of the Cathode:

The active material of the cathode is not particularly limited. It may be selected from the group consisting of:
- a compound i) of formula $Li_xMn_{1-y-z}M'_yM''_zPO_4$ (LMP), wherein M' and M'' are different from each other and are selected from the group consisting of B, Mg, Al, Si, Ca, Ti, V, Cr, Fe, Co, Ni, Cu, Zn, Y, Zr, Nb and Mo, with $0.8 \leq x \leq 1.2$; $0 \leq y \leq 0.6$; $0 \leq z \leq 0.2$;
- a compound ii) of formula $Li_xM_{1-y-z-w}M'_yM''_zM'''_wO_2$ (LMO2), wherein M, M', M'' and M''' are selected from the group consisting of B, Mg, Al, Si, Ca, Ti, V, Cr, Mn, Fe, Co, Ni, Cu, Zn, Y, Zr, Nb, W and Mo, with the proviso that M or M' or M'' or M''' is selected from Mn, Co, Ni, or Fe; M, M', M'' and M''' being different from each other; with $0.8 \leq x \leq 1.4$; $0 \leq y \leq 0.5$; $0 \leq z \leq 0.5$; $0 \leq w \leq 0.2$ and $x+y+z+w<2.1$;
- a compound iii) of formula $Li_xMn_{2-y-z}M'_yM''_zO_4$ (LMO), wherein M' et M'' are selected from the group consisting of B, Mg, Al, Si, Ca, Ti, V, Cr, Fe, Co, Ni, Cu, Zn, Y, Zr, Nb and Mo; M' and M'' are different from each other, and $1 \leq x \leq 1.4$; $0 \leq y \leq 0.6$; $0 \leq z \leq 0.2$;
- a compound iv) of formula $Li_xFe_{1-y}M_yPO_4$, wherein M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$;
- a compound v) of formula $xLi_2MnO_3$; $(1-x)LiMO_2$ wherein M is selected from the group consisting of Ni, Co and Mn and $x \leq 1$,
- or a mixture of the compounds i) to v).

An example of compound i) is $LiMn_{1-y}Fe_yPO_4$. A preferred example is $LiMnPO_4$.

Compound ii) may have the formula $Li_xM_{1-y-z-w}M'_yM''_zM'''_wO_2$, wherein $1 \leq x \leq 1.15$; M is Ni; M' is Mn; M'' is Co and M''' is selected from the group consisting of B, Mg, Al, Si, Ca, Ti, V, Cr, Fe, Cu, Zn, Y, Zr, Nb, W and Mo or a mixture thereof; $1-y-z-w>0$; $y>0$; $z>0$; $w \geq 0$.

Compound ii) may have the formula $LiNi_{1/3}Mn_{1/3}Co_{1/3}O_2$.

Compound ii) may also have the formula $Li_xM_{1-y-z-w}M'_yM''_zM'''_wO_2$, wherein $1 \leq x \leq 1.15$; M is Ni; M' is Co; M'' is Al, and M''' is selected from the group consisting of B, Mg, Si, Ca, Ti, V, Cr, Mn, Fe, Cu, Zn, Y, Zr, Nb, W and Mo or a mixture thereof; $1-y-z-w>0$; $y>0$; $z>0$; $w>0$. Preferably, $x=1$; $0.6 \leq 1-y-z \leq 0.85$; $0.10 \leq y \leq 0.25$; $0.05 \leq z \leq 0.15$ and $w=0$.

Compound ii) may also be selected from the group consisting of $LiNiO_2$, $LiCoO_2$, $LiMnO_2$, in which Ni, Co and Mn may be substituted by one or more of the elements selected from the group consisting of Mg, Mn (except for $LiMnO_2$), Al, B, Ti, V, Si, Cr, Fe, Cu, Zn, Zr.

An example of compound iii) is $LiMn_2O_4$.
An example of compound iv) is $LiFePO_4$.
An example of compound v) is $Li_2MnO_3$.

The cathode active material may be at least partially covered by a carbon layer.

Binder for the Cathode and Anode:

The cathode and anode active materials of the lithium-ion electrochemical cell are generally mixed with one or more binder(s), the function of which is to bind the active material particles together as well as to bind them to the current collector on which they are deposited.

The binder may be selected from carboxymethyl cellulose (CMC), butadiene-styrene copolymer (SBR), polytetrafluoroethylene (PTFE), polyamideimide (PAI), polyimide (PI), styrene-butadiene rubber (SBR), polyvinyl alcohol, polyvinylidene fluoride (PVDF), and a mixture thereof. Such binders typically may be used in the cathode and/or in the anode.

Current Collector of the Cathode and the Anode:

The current collector of the cathode and anode is in the form of a solid or perforated metal strip. The strip can be made from various materials. Mention may be made of copper or alloys of copper, aluminum or alloys of aluminum, nickel or alloys of nickel, steel and stainless steel.

The current collector of the cathode is generally an aluminum strip or an alloy mainly comprising aluminum. The current collector of the anode is generally a copper strip or an alloy comprising a majority of copper. The thickness of the strip of the cathode may be different from that of the strip of the anode. The strip of the cathode or anode has a thickness generally between 6 and 30 μm.

In a preferred embodiment, the aluminum collector of the cathode is coated with a conductive coating, such as carbon black, graphite.

Production of the Anode:

The anode active material is mixed with one or more of the above-mentioned binders and optionally a good electrically conductive compound, such as carbon black. An ink is obtained which is deposited on one or both sides of the current collector. The ink-coated current collector is rolled to adjust its thickness. An anode is thus obtained.

The composition of the ink deposited on the anode may be as follows:
- from 75 to 96% of anode active material, preferably from 80 to 85%;
- from 2 to 15% binder(s), preferably about 5%;
- from 2 to 10% of electrically conductive compound, preferably about 7.5%.

Production of the Cathode:

This is done in the same way as that used to obtain the anode but starting from cathode active material.

The composition of the ink deposited on the cathode may be as follows:
- from 75 to 96% of anode active material, preferably from 80 to 90%;
- from 2 to 15% binder(s), preferably about 10%;
- from 2 to 10% carbon, preferably about 10%.

Separator:

The material for the separator may be selected from the following materials: a polyolefin, for example polypropylene, polyethylene, polyester, polymer-bonded glass fiber, polyimide, polyamide, polyaramid, polyamideimide, and cellulose. The polyester may be selected from polyethylene terephthalate (PET) and polybutylene terephthalate (PBT). Advantageously, the polyester or polypropylene or polyethylene contains, or is coated with, a material selected from the group consisting of a metal oxide, a carbide, a nitride, a boride, a silicide and a sulfide. The material may be $SiO_2$ or $Al_2O_3$.

Preparation of the Electrode Plate Group:

An electrode plate group is formed by interposing a separator between at least one cathode and at least one anode. The electrode plate group is inserted into the container of the cell. The container of the cell may be of parallelepipedal or cylindrical format. In the latter case, the electrode plate group is coiled to form a cylindrical assembly of the electrodes.

Filling the Container:

The container provided with the electrode plate group is filled with the electrolyte composition as described above.

EXAMPLES

Lithium-ion electrochemical cells of prismatic format, having a capacity of about 4 Ah, were produced. They were of MP 174565 xtd format (width: 18.1 mm, thickness: 45.5 mm, height: 68.7 mm). They comprise an anode, the active material of which is graphite and a cathode, the active material of which has the formula $LiNi_{1/3}Mn_{1/3}Co_{1/3}O_2$. The ratio of the capacity of the anode active material to the capacity of the cathodic active material is 1.035. The separator is a PP/PE/PP tri-layer separator (PP: polypropylene; PE: polyethylene). The containers of the cells were filled with an electrolyte, the composition of which is referenced from A to G. Table 1 below indicates the different electrolyte compositions A to G. For convenience, the electrochemical cells will be referred to by reference to the electrolyte composition they contain. Cells A to G underwent formation at a temperature of 60° C.

TABLE 1

| Electrolyte composition | Solvent ** | $LiPF_6$ (mol · L$^{-1}$) | $LiPO_2F_2$ (%)*** | VC (%)*** |
|---|---|---|---|---|
| A* | EC:EMC 30:70 | 1.2 | — | — |
| B* | F1EC:F3EMC 30:70 | 1.2 | — | — |
| C* | F1EC:F3EMC 30:70 | 2 | — | — |
| D* | EC:PC: EMC:DMC 10:20:25:45 | 1.0 | — | 3 |
| E | F1EC:F3EMC: HFMP 30:45:25 | 1.2 | — | — |
| F | F1EC:F3EMC: HFMP 30:45:25 | 1.2 | 0.1 | — |
| G | F1EC:F3EA: HFMP 30:45:25 | 1.2 | — | — |

*Electrolyte composition not forming part of the invention
** Volume Ratios
***Percentage by weight expressed relative to the sum of the weight of the solvent and the weight of $LiPF_6$
EC: ethylene carbonate
PC: propylene carbonate
EMC Ethyl methyl carbonate
DMC: dimethyl carbonate a) Effect of Replacing Non-Fluorinated Compounds with Fluorinated Compounds on Service Life of Cells:

Composition A contains a solvent consisting of a mixture of EC and EMC. Composition B differs from composition A in that EC and EMC were replaced by F1EC and F3EMC. Composition C differs from composition B in that the $LiPF_6$ salt concentration was increased to 2 mol·L$^{-1}$.

FIG. 1 shows the variation in the ratio between the capacity of cells A, B and C and their initial capacity during cycling comprising a first series of 100 cycles performed at a temperature of 25° C. followed by a second series of 200 cycles performed at a temperature of 60° C. Each cycle consists of charging at a rate of C/3 up to a voltage of 4.3 V, followed by a discharge at a rate of C/3 down to a voltage of 2.7 V. Allowable capacity loss is set to be 20% of the initial capacity. It is materialized in FIG. 1 by a horizontal line at the ordinate 0.8.

It is found that the replacement of EC and EMC by F1EC and F3EMC makes it possible to increase the service life of the cell because at the 250th cycle, the capacity of cell B represents about 87% of its initial value while that of cell A is only about 77% of its initial value. Nevertheless, failure of cell B due to its container breaking open was encountered at cycle 260. This is explained by the high reactivity of the graphite anode as regards F1EC. F1EC gets reduced with generation of a large amount of gas ($CO_2$) that causes the container to break open. By increasing the $LiPF_6$ salt concentration to 2 mol·L$^{-1}$ in cell C, the number of molecules of F1EC solvating lithium ions is reduced. This reduces the amount of reduction of the F1EC molecules at the anode and the amount of $CO_2$ generated. Cell C has a capacity retention very close to that of cell B, without however undergoing breaking open of its container beyond the 250$^{th}$ cycle. Swelling of the container of cell C is less than that of cell A (+16.9% for cell C with respect to +23% for cell A after 100 cycles at 25° C. and 100 cycles at 60° C.).

b) Effect of the Presence of Hexafluoromethoxypropane (HFMP) in the Electrolyte of Cells The cycling performance of cells E, F, G the electrolyte of which contains HFMP was compared to that of cell D the electrolyte of which does not contain it. Each cycle consists of a charge at a rate of C/3 up to a voltage of 4.3 V, followed by a discharge at a rate of C/3 down to a voltage of 2.7 V. FIG. 2 shows the variation in the capacity of cells D to G expressed as a percentage of their initial capacity during cycling at a temperature of 60° C. It is found that cells E, F and G the electrolyte of which contains HFMP have a lifetime greater than that of cell D. Cell E failed at the 136$^{th}$ cycle due to its container breaking open. The Applicant assumes that the presence of HFMP contributes to increasing the service life of cells E, F and G but it can cause an excessive concentration of F1EC at the anode and generate a large amount of gas by decomposition of F1EC at the anode. In order to prevent the formation of an excessively large passivation layer and the generation of gas, it is possible to add $LiPO_2F_2$ to the electrolyte and/or to replace F3EMC by F3A. This is demonstrated by the results obtained with cells F and G. The container of cells F and G remains sealed right up until the end of cycling. This is explained by the presence of $LiPO_2F_2$ in composition F and by the presence of trifluoroethyl acetate (F3EA) in composition G. The presence of trifluoroethyl acetate (F3EA) makes it possible to decrease the solvation number of F1EC and thus to limit the reducing reaction of F1EC at the anode, even in the absence of $LiPO_2F_2$.

FIG. 3 shows the variation in coulombic efficiency of cells D to G under the same cycling conditions as those of FIG. 2. The coulombic efficiency of cells E, F and G whose electrolyte contains HFMP is higher than that of cell D whose electrolyte does not contain it. This result confirms the value of using HFMP in the solvent to increase the service life of the cells.

FIG. 4 shows the increase in the volume of the container of cells D to G following cycling of these cells for 100 cycles at a temperature of 60° C. Cells D, F and G are those which swell the least. However, cell D, which is not part of the present invention had poor capacity retention while cells G and F according to the invention showed good capacity retention.

c) Electrochemical Capacity Induced by the Reducing Reaction of Compounds of the Solvent During Charging of the Cell Cell formation was carried out on cells A, B, C and E at a temperature of 60° C., at a rate of C/10 up to a voltage of 4.3 V. A passivation layer (SEI) is formed at the anode during this formation. This layer results from the reduction of certain chemical species from the solvent at the anode. The electrochemical capacity induced by the reaction of these species was measured. It is shown in FIG. 5 for a cell voltage ranging from 1.5 to 3.2 V It can be noted by comparison between the curve obtained for cell E and those obtained with cells B and C that the presence of HFMP in the electrolyte increases the magnitude of the reduction peak for F1EC. The value of the measured electrochemical capacity peak for cell E is about 450 $mAh \cdot V^{-1}$ while it is only about 290 $mAh \cdot V^{-1}$ for cell B and about 320 $mAh \cdot V^{-1}$ for cell C. Since a larger amount of F1EC surrounds the lithium ions in the case of a ternary electrolyte according to the invention, this larger amount of F1EC is brought into contact with the interface of the anode to be reduced there and contribute to the growth of the passivation layer.

d) Influence of the Composition of the Solvent of the Electrolyte on the Increase in Temperature of the Cell During its First Charge FIG. 6 shows the increase in the temperature of the outer wall of the container of cells B, E, F and G during the formation of the passivation layer (SEI) during the first charging of these cells. The increase in temperature is shown for different values of the F1EC solvation number. This increase in temperature is proportional to the amount of energy released during the F1EC exothermic reduction reaction at the anode. Cell E is the one whose electrolyte composition reacts the most with the anode and thus leads to the highest temperature rise (+9.5%). The thickest passivation layer is that obtained for cell E. The addition of 0.1% by weight of $LiPO_2F_2$ mitigates the formation of the passivation layer (SEI), therefore the temperature rise of the cell and the formation of gas in the container. This is demonstrated by cell F for which the temperature increase is no more than +8.5% instead of +9.5%. Replacing F3EMC with F3EA (composition G) has the effect of reducing the temperature rise of the cell. The latter is no more than 6%. This suggests that the presence of F3EA reduces the number of F1EC molecules around the lithium ions, and thus the reactivity of F1EC at the anode. Composition B which does not contain HFMP, and therefore does not change the solvation number of F1EC leads to a low temperature rise of about +4%. As a comparison, the observed temperature rise for the cell containing the non-fluorinated composition is about 7.5%.

e) Highlighting the Reduction of F1EC Reactivity and Limiting of the Growth of the Passivation Layer Thanks to the Presence of $LiPO_2F_2$:

Two button format cells comprising a cathode based on $LiNi_{0.6}Co_{0.2}Mn_{0.2}O_2$, an anode comprising graphite and 1.55% by weight of silicon oxide were manufactured and filled with one of 40 μL of the electrolyte composition E, the other with the same volume of the electrolyte composition F. A first charge was carried out at a temperature of 60° C. on cells E and F, at a rate of C/10 up to a voltage of 4.2 V. A passivation layer (SEI) is formed at the anode during the first charge. This results from the reduction at the anode of certain chemical species of the solvent. The electrochemical capacity induced by this reduction reaction was measured during this first charge. It is shown in FIG. 7 for a voltage of between 1.5 and 3.2 V. The magnitude of the F1EC reduction peak in electrolyte F is significantly lower than that of the reduction peak of F1EC in electrolyte E This indicates that F1EC in composition F is less reactive than in composition E. This decrease in the magnitude of the reduction peak can be attributed to the presence of 0.1% by weight of $LiPO_2F_2$ in composition F.

The invention claimed is:

1. An electrolyte composition comprising:
a) a solvent comprising:
a mixture of 1,1,1,3,3,3-hexafluoro-2-methoxypropane (HFMP) and/or of 1,1,1,3,3,3-hexafluoro-2-(fluoromethoxy) propane (HFMFP), ethylene monofluorocarbonate (F1EC) and 2,2,2-trifluoroethyl acetate (F3EA),
wherein:
the 1,1,1,3,3,3-hexafluoro-2-methoxypropane (HFMP) and/or the 1,1,1,3,3,3-hexafluoro-2-(fluoromethoxy) propane (HFMFP) makes up 20 to 30% of the volume of the solvent,
the ethylene monofluorocarbonate (F1EC) makes up 15 to 40% of the volume of the solvent,
the 2,2,2-trifluoroethyl acetate (F3EA) makes up 30 to 50% of the volume of the solvent,
b) at least one salt the cation of which is the cation of an alkali metal.

2. The electrolyte composition of claim 1, further comprising, in addition to said at least one salt, lithium difluorophosphate $LiPO_2F_2$.

3. The electrolyte composition of claim 2, wherein the percentage by weight of lithium difluorophosphate makes up from 0.05 to 5% of the weight of a combined weight of the solvent and the said at least one salt.

4. The electrolyte composition of claim 3, wherein the percentage by weight of lithium difluorophosphate makes up from 0.05 to 2% of the weight of a combined weight of the solvent and the said at least one salt.

5. The electrolyte composition of claim 4, wherein the percentage by weight of lithium difluorophosphate makes up from 0.1 to 1% of the weight of a combined weight of the solvent and the said at least one salt.

6. The electrolyte composition according to claim 2, comprising lithium hexafluorophosphate (LiPF6) and lithium difluorophosphate (LiPO2F2).

7. The electrolyte composition according to claim 6, further comprising lithium fluorosulfonyl imide (LiFSI).

8. The electrolyte composition according to claim 1, wherein the said at least one salt is a lithium salt and its concentration is greater than or equal to 0.7 mol.L$^{-1}$ and less than or equal to 4 mol.L$^{-1}$.

9. The electrolyte composition according to claim 8, wherein the lithium salt is lithium hexafluorophosphate (LiPF$_6$).

10. An electrochemical cell comprising:
   at least one anode,
   at least one cathode,
   the electrolyte composition according to claim 1.

11. The electrochemical cell of claim 10, of the lithium-ion type.

12. The electrochemical cell of claim 10, wherein the anode is graphite-based.

* * * * *